United States Patent [19]
Ichikawa

[11] Patent Number: 5,884,981
[45] Date of Patent: Mar. 23, 1999

[54] WHEEL COVER FOR A CAR AND A CLIP DEVICE

[75] Inventor: Takashi Ichikawa, Aichi, Japan

[73] Assignee: Kabushiki Kaisha Tokai Rika Denki Seisakusho, Aichi-ken, Japan

[21] Appl. No.: 821,574

[22] Filed: Mar. 18, 1997

[30] Foreign Application Priority Data

Mar. 18, 1996 [JP] Japan .................................. 8-060836

[51] Int. Cl.$^6$ ...................................................... B60B 7/10
[52] U.S. Cl. ...................................... 301/37.34; 301/37.36
[58] Field of Search ............................... 301/37.1, 37.24, 301/37.31, 37.34, 37.36, 37.42, 108.1

[56] References Cited

U.S. PATENT DOCUMENTS

| | | | |
|---|---|---|---|
| 2,455,151 | 11/1948 | Wood | 301/37.34 |
| 4,344,654 | 8/1982 | Apezynski | 301/37.42 X |
| 4,889,394 | 12/1989 | Ruspa | 301/37.36 |
| 5,366,278 | 11/1994 | Brumfield | 301/37.36 X |

*Primary Examiner*—Russell D. Stormer
*Attorney, Agent, or Firm*—Birch, Stewart, Kolasch & Birch LLP

[57] ABSTRACT

A clip including a first clip having a sandwiching portion which is installed on a rim flange edge of a disc wheel; and a second clip having a receiving surface for fixing a wheel cover body thereto. The first and second clips are angle-adjustably connected with each other.

4 Claims, 7 Drawing Sheets

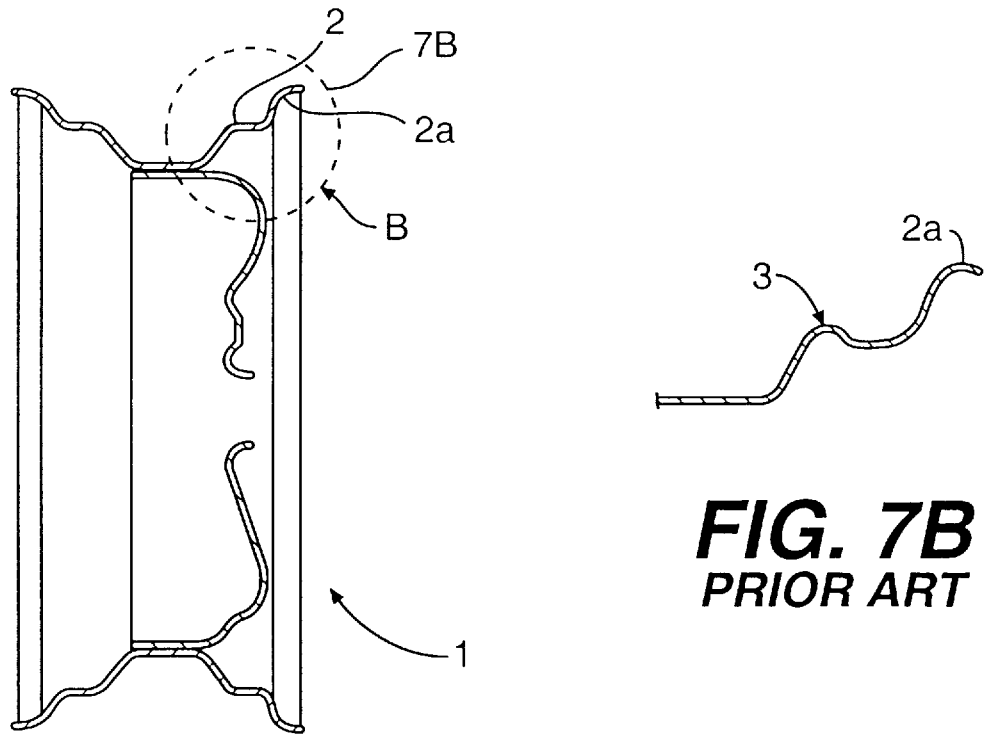
FIG. 7A
PRIOR ART
FIG. 7B
PRIOR ART
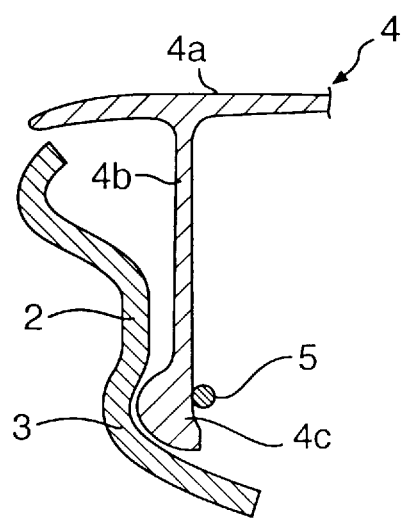
FIG. 8
PRIOR ART

WHEEL COVER FOR A CAR AND A CLIP DEVICE

BACKGROUND OF THE INVENTION

1. Field of the Invention

The present invention generally relates to a wheel cover for use in a car and particularly relates to a wheel cover installing clip device comprising a sandwiching portion which is installed on a rim flange edge of a disc wheel of the car and a connection surface for fixing the wheel cover body thereto.

2. Description of the Related Art

The wheel cover is hitherto mounted on the disc wheel by utilizing a hump formed on a rim of the disc wheel. FIG. 7A is a sectional view showing a conventional disc wheel. FIG. 7B is an enlarged sectional view showing a part (B) of the disc wheel shown in FIG. 7A. As shown in FIG. 7B, a hump 3 is formed at a predetermined position of a rim 2 of a disc wheel 1 such that the hump 3 projects therefrom outward in the radial direction of the disc wheel 1. The hump 3 is formed to prevent the edge of a tire from moving inward. The hump 3 projects only about 0.5 mm from the rim 2, although it is exaggeratively illustrated.

A wheel cover 4 to be mounted on the disc wheel 1 by using the hump 3 has a configuration as shown in FIG. 8. That is, a disc-shaped wheel cover body 4a is formed integrally with a plurality of claws 4b projecting from the underside thereof by injection molding. The front end 4c of the claw 4b is fitted into a concave formed on the underside of the hump 3 and pressed thereinto. Then, the front end 4c of the claw 4b is pressed outward in the radial direction of the disc wheel 1 by means of a wire ring 70. In this manner, the wheel cover 4 is mounted on the disc wheel 1.

Many types of disc wheels 1 are manufactured. There is a variety in the type of disc wheels 1 having the same diameter. In most cases, the positions, depths, and sizes of the hump 3 are different from each other, respectively depending on the types of the disc wheels 1. Thus, the wheel cover 4 which is fixed to the disc wheel 1 utilizing the hump 3 is used exclusively for one type of the disc wheel 1.

In order to overcome this problem, the present applicant proposed a wheel cover which can be installed on disc wheels irrespective of types thereof if they have the standardized same diameter. That is, a clip is mounted on the rim flange edge 2a of the disc wheel 1 to install the wheel cover body on the disc wheel 1, as disclosed in Japanese Patent Applications Nos. 7-211628 and 7-217044.

FIGS. 9 and 10 show the construction having a clip 6a or 6b for installing a wheel cover body 7a or 7b on a disc wheel 1. Each of the clip 6a shown in FIG. 9 and the clip 6b shown in FIG. 10 has a sandwiching portion (A) for sandwiching the rim flange edge 2a of the rim 2 of the disc wheel 1 and the connection or receiving surface (B) for fixing the wheel cover 7a or the wheel cover 7b thereto. In FIG. 9, a plane fastener 8a for fixing the wheel cover 7a to a connection surface (B) is provided between the underside of the wheel cover 7a and the connection surface (B) of the clip 6a. The wheel cover body 7a is pressed against the connection surface (B) of the clip 6a at a right angle therewith to install the wheel cover body 7a on the connection surface (B). The construction shown in FIG. 10 has a snap engaging means 8b provided between the underside of the wheel cover body 7b and the connection surface (B) of the clip 6b. The snap engaging means 8b consists of a female button and a male button which engages each other. The wheel cover body 7b is pressed against the connection surface (B) of the clip 6b at a right angle therewith to install the wheel cover body 7b on the connection surface (B).

It often occurs that the rim flange edge 2a of the disc wheel 1 does not have a size not conforming to the standardized size and that the terminated portion of the rim flange edge 2a is dislocated from the predetermined position. Therefore, the clips 6a and 6b are likely to incline when they are installed on the rim flange edge 2a not conforming to the standardized size, which necessitates the control of the size of the clip: If the rim flange edge 2a is shorter than the standardized size as shown by an imaginary line of FIG. 11, one end of each of the clips 6a and 6b inclines outward (upward in FIG. 11) in the radial direction of the disc wheel 1, whereas if the rim flange edge 2a is longer than the standardized size as shown by an imaginary line of FIG. 12, one end of each of the clips 6a and 6b inclines inward (downward in FIG. 12) in the radial direction of the disc wheel 1. In both cases, it is necessary to adjust the connection surface (B) to be horizontal, namely, parallel with the underside of the wheel cover bodies 7a and 7b. In the former case as shown in FIG. 11, it is possible to install the wheel cover bodies 7a and 7b on the clips 6a and 6b, respectively by strongly pressing the wheel cover bodies 7a and 7b against the connection surface (B) and by pressing one end of the clips 6a and 6b downward, with the connection surface (B) placed in position relatively to the wheel cover bodies 7a and 7b, respectively. In the latter case as shown in FIG. 12, there is a gap between the connection surface (B) of each of the clips 6a and 6b and the underside of each of the wheel cover bodies 7a and 7b, which necessitates the use of the clips 6a and 6b whose connection surface is horizontal, namely, parallel with the underside of the wheel cover bodies 7a and 7b.

SUMMARY OF THE INVENTION

It is accordingly an object of the present invention to provide an improved wheel cover-installing clip device in which the angle of a wheel cover-receiving surface can be adjusted in conformity to the inclination of a wheel cover body, even though the position of a rim flange edge on which the clip device has been installed is dislocated from a predetermined position, so as to eliminate the need for the control of a clip size.

The clip device comprises a first clip member having a sandwiching portion; and a second clip member having a connection surface. The clip device further comprises a connection means for angle-adjustably connecting the first and second clip members with each other. The connection means comprises a supporting portion formed on one of the first and second clip members; and a sandwiching member formed on the other of the first and second clip members and angle-adjustably sandwiching the supporting portion.

In the above-described construction, the first clip member is installed on the rim flange edge of the disc wheel in conformity to the shape or length thereof. Thus, when the rim flange edge is shorter or longer than the standardized size, the first clip member is installed on the disc wheel, with the first clip member inclining to one side relatively to the disc wheel. Because the second clip member having the connection surface formed thereon is angle-adjustably connected with the first clip member, the angle of the connection surface can be appropriately adjusted in conformity to the inclination of the wheel cover body in installing the wheel cover body on the connection surface. Accordingly, the wheel cover can be installed on the disc wheel, irrespective of the variation in the size of the rim flange, without the control of the size of the clip.

In the above-described construction, the sandwiching member may have upper and lower sandwiching surfaces confronting each other to sandwich the supporting portion of the first clip member therebetween. A projection which contacts one of the upper and lower surfaces of the supporting portion of the first clip member is formed on each of the two sandwiching surfaces. The projection may be U-shaped or V-shaped in section. In this case, namely, in line contact, the upper edge of the projection formed on the lower sandwiching surface contacts the lower surface of the supporting portion of the first clip member in a direction substantially perpendicular to a diameter of the wheel cover, whereas the lower edge of the projection formed on the upper sandwiching surface contacts the upper surface of the supporting portion of the first clip member in the above-described direction. The projection may be spherical, conical, or quadrangular-pyramidal. In this case, namely, in point contact, the upper and lower points of the projection contact the lower and upper surfaces of the supporting portion of the first clip member, respectively.

In line contact, even though the first clip member is inclined when it has been installed on the rim flange edge due to the variation in the size of the rim flange, the angle of the connection surface can be adjusted to that of the wheel cover body. In point contact, the inclination of the sandwiching member of the second clip member can be appropriately adjusted to that of the supporting portion of the first clip member. Therefore, the angle of the connection surface can be adjusted to that of the wheel cover, even though the first clip member inclines to one side relatively to the rim flange edge.

The wheel cover comprises a disc-shaped wheel cover body; and fixtures, provided on the second clip member and the wheel cover body, for fixing the wheel cover body to the connection surface of the second clip member having the above-described construction. In this construction, the angle of the connection surface of the second clip member can be adjusted easily. Thus, the present invention provides a wheel cover which can be easily installed on the disc wheel.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 7A is a schematic sectional view showing a conventional disc wheel;

FIG. 7B is a sectional view showing an enlarged part (B) of the disc wheel shown in FIG. 7A;

FIG. 8 is a sectional view showing an example of a conventional construction for installing a wheel cover on a disc wheel;

DESCRIPTION OF THE PREFERRED EMBODIMENTS

A wheel cover and an installing clip device according to an embodiment of the present invention will be described below in detail with reference to FIGS. 1 through 6.

Figure 1:
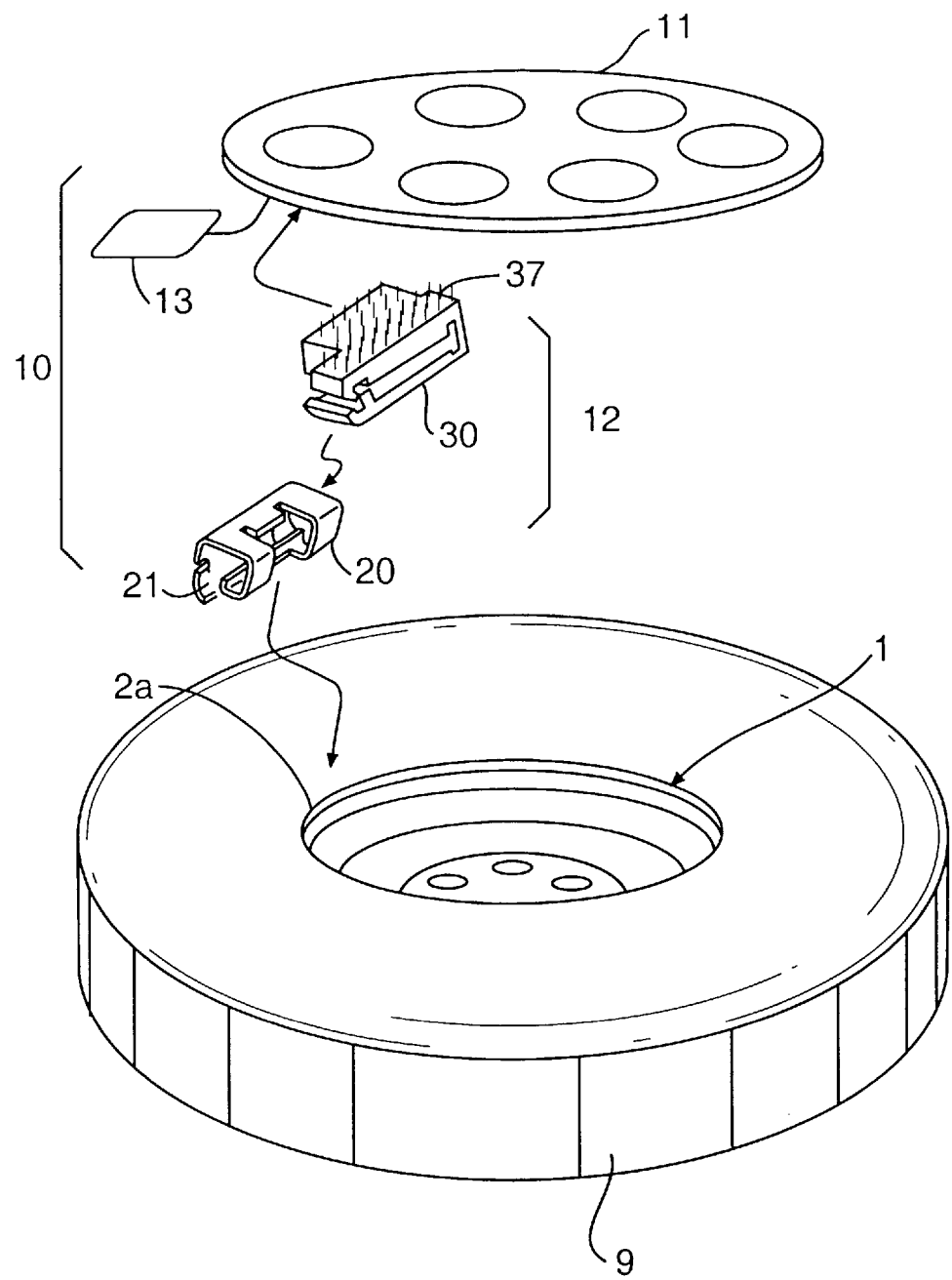
FIG. 1 is an exploded perspective view showing a state in which a wheel cover according to an embodiment of the present invention is installed on a disc wheel of a car.

In FIG. 1, reference numerals 1 and 9 denote the disc wheel and a tire to be installed on the disc wheel 1, respectively. The wheel cover 10 comprises a disc-shaped wheel cover body 11 and an installing clip device 12 (hereinafter referred to as clip 12) serving as a means for installing the wheel cover body 11 on the disc wheel 1. Although only one clip 12 is shown in FIG. 1, preferably, three or more clips 12 are installed on a rim flange edge 2a.

Figure 3:
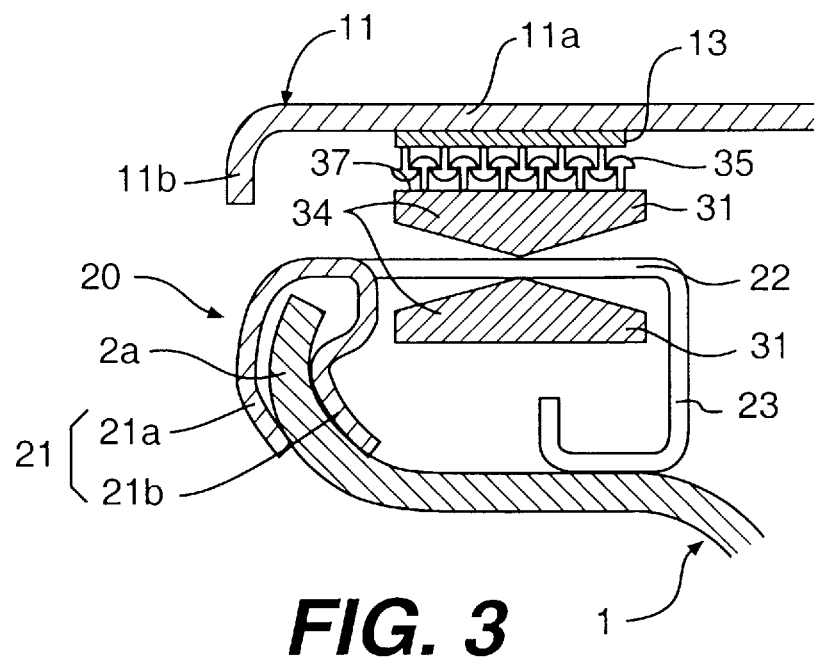
FIG. 3 is a sectional view showing a state in which the wheel cover has been installed on the disc wheel.

As shown in FIG. 3, the wheel cover body 11 comprises a disc-shaped cover 11a having an outer diameter equal to or a little larger than that of the rim flange edge 2a of the disc wheel 1 and a peripheral wall 11b extending downward, namely, toward the disc wheel 1 from the peripheral edge of the cover 11a. The peripheral wall 11b allows the wheel cover body 11 to have a sufficient strength.

Each clip 12 comprises a first clip 20 having a sandwiching portion 21 which sandwiches the rim flange edge 2a of the disc wheel 1 and a second clip 30 having a connection or receiving surface 37 for fixing the wheel cover body 11 thereto. The first and second clip 20 and 30 are angle-adjustably connected with each other.

The sandwiching portion 21 of the first clip 20 has an outer sandwiching wall 21a and an inner sandwiching wall 21b for sandwiching the rim flange edge 2a, of the disc wheel 1, which is inserted thereinto under pressure. The outer sandwiching wall 21a positioned outward of the rim flange edge 2a is formed entirely in the width direction of the first clip 20, whereas the inner sandwiching wall 21b positioned inward of the rim flange edge 2a is formed in the center part thereof in the width direction thereof. Both ends of the outer sandwiching wall 21a not confronting the inner sandwiching wall 21b, have, respectively, cut flaps 21c urging inwardly the rim flange edge 2a. The sandwiching portion 21 of the first clip 20 is curved slightly along the circumferential direction of the disc wheel 1 in conformity to the curvature of the rim flange edge 2a of the disc wheel 1.

Two supporting portions 22 parallel with the wheel cover body 11 extend from both sides of the sandwiching portion 21 of the first clip 20. As shown in FIG. 3, a leg 23 extends downward from one end of each supporting portion 22 at a right angle therewith, with the front end of the leg 23 curved toward the sandwiching portion 21. Although the first clip 20 consists of a bent metal plate having a high degree of elasticity, it may be made of a plastic material and its shape may be altered as desired.

Figure 4A:
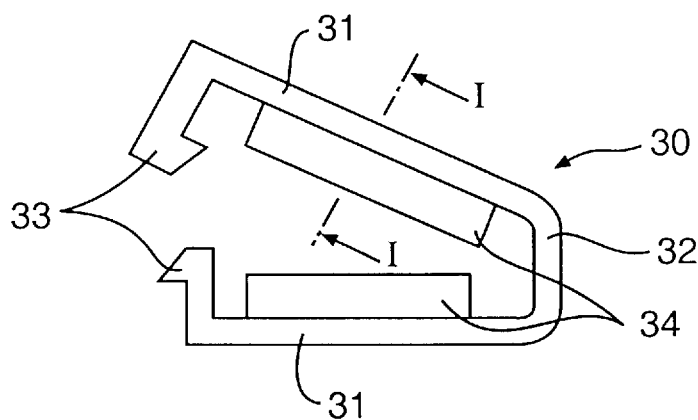
FIG. 4A is a side view showing the clip shown in FIG. 3.
Figure 4B:
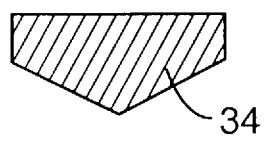
FIGS. 4B and 4C are sectional views taken along a line I—I of FIG. 4A.
Figure 4C:
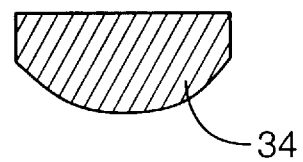
Figure 5A:
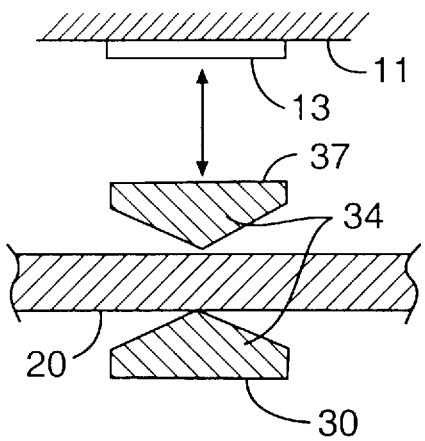
FIG. 5A–5D are sectional views showing various states in which a wheel cover body is installed on a connection surface of the clip.
Figure 5B:
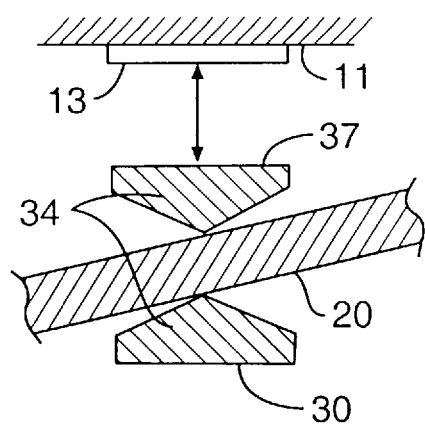
Figure 5C:
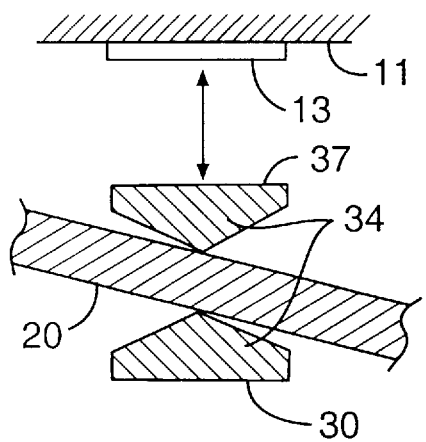
Figure 5D:
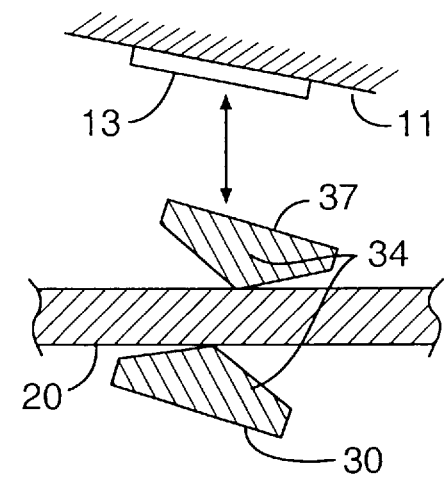

The second clip 30 is made of a molded plastic material and has upper and lower sandwiching members 31 formed to angle-adjustably sandwich the supporting portion 22 of the first clip 20. A hinge 32 positioned intermediate between the upper and lower sandwiching members 31 is continuous therewith, thus serving as a means for elastically moving the lower sandwiching member 31 upward and downward. A locking claw 33 for keeping the closed state of the upper and lower sandwiching members 31 is formed at an end of each of the upper and lower sandwiching portions 31. As shown in FIG. 4B which is a sectional view, showing a projection 34, taken along the line I—I of FIG. 4A, the projection 34 V-shaped in section is formed on the inner surface of each sandwiching member 31. The upper end of the projection 34 of the lower sandwiching member 31 contacts (line contact) the lower surface of the supporting portion 22 of the first clip 20, whereas the lower end of the projection 34 of the upper sandwiching member 31 contacts (line contact) the upper surface of the supporting portion 22 in a direction substantially perpendicular to a diameter of the wheel cover 10. As shown in FIG. 4C, the projection 34 may be U-shaped in section.

Figure 2:
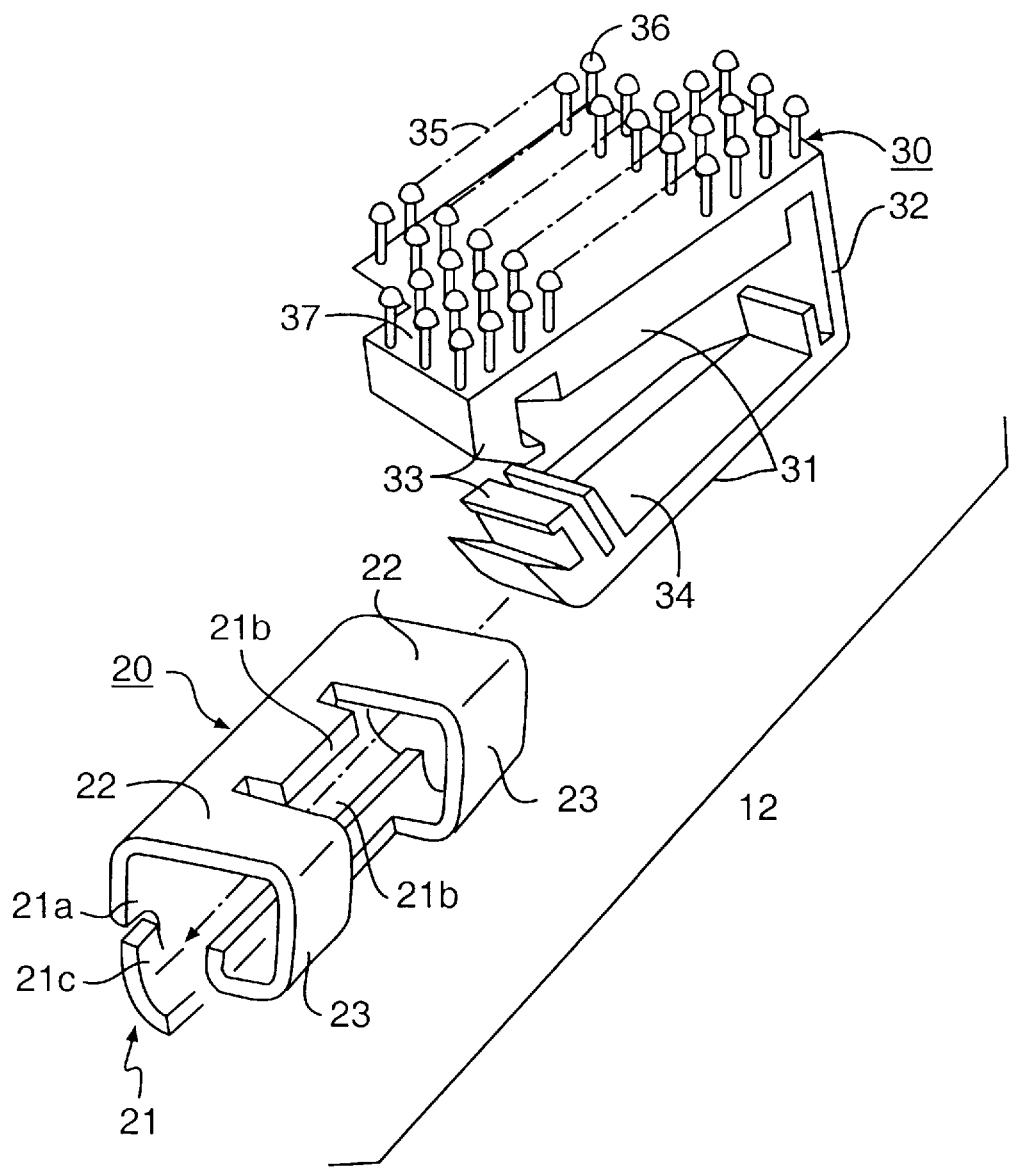
FIG. 2 is a perspective view showing a clip device according to an embodiment of the present invention.

A plane fastener 35 is formed on the upper surface, namely, the receiving surface 37 of the second clip 30. As shown in FIG. 2, the plane fastener 35 comprises a large number of mushroom-shaped projections 36 densely formed on the receiving surface 37. In the embodiment, the mushroom-shaped projections 36 are formed integrally with the second clip 30. In order to fix the wheel cover body 11 to the receiving surface 37 of the second clip 30, a plane fastener 13 is fixed to the underside of the wheel cover body 11 in correspondence to the position of the second clip 30, as shown in FIG. 1. Although not shown in detail in FIG. 1, a large number of mushroom-shaped projections 36 similar to those formed on the receiving surface 37 of the second clip 30 is densely formed on the underside of the plane fastener 13.

The wheel cover 10 having the above-described construction can be installed on the disc wheel 1 as follows: The first clip 20 is mounted on the rim flange edge 2a. Then, the supporting portion 22 is sandwiched between the upper and lower sandwiching members 31 of the second clip 30. Then, the wheel cover body 11 is pressed against the plane fastener 35 of the second clip 30 by locating the plane fastener 13 formed on the underside of the wheel cover body 11 in coincidence with that of the plane fastener 35 of the second clip 30. In the wheel cover-installing operation, because the leg 23 elastically supports the wheel cover body 11 while it is being pressed against second clip 30, the front ends of the mushroom-shaped projections 17 of both plane fasteners 35 and 13 can engage each other tightly. In the state in which the wheel cover 10 has been installed on the disc wheel 1, the wheel cover 10 covers the disc wheel 1 in the region thereof positioned inward from the rim flange edge 2a of the disc wheel 1 in the radial direction thereof, because the diameter of the wheel cover 10 is equal to or slightly greater than that of the rim flange edge 2a.

FIG. 5 is a sectional view showing various states in which the wheel cover body 11 is installed on the receiving surface 37 of the second clip 30. FIG. 5A shows a state in which the rim flange edge 2a is formed in conformity to the standardized size so that the first clip 20 is kept horizontal, namely, parallel with the underside of the wheel cover body 11. FIGS. 5B and 5C show a state in which the rim flange edge 2a is formed not in conformity to the standardized size so that the first clip 20 is not kept horizontal, namely, not parallel with the underside of the wheel cover body 11. In the cases shown in FIGS. 5B and 5C, even though the first clip 20 is not horizontal, namely, not parallel with the underside of the wheel cover body 11, the second clip 30 can be allowed to be horizontal, namely, parallel with the wheel cover body 11. Therefore, the wheel cover body 11 can be reliably installed on the receiving surface 37 without an accurate control of the clip 12. When the first clip 20 is horizontal and the wheel cover body 11 is not parallel therewith as shown in FIG. 5D, the inclination of the second clip 30 can be allowed to be parallel with the inclination of the wheel cover body 11.

Figure 6A:
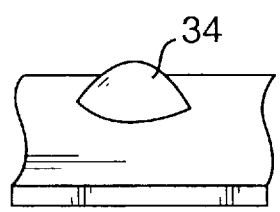
FIGS. 6A and 6B are perspective views showing a modification of a projection to be formed on an inner surface of a sandwiching portion of a second clip.
Figure 6B:
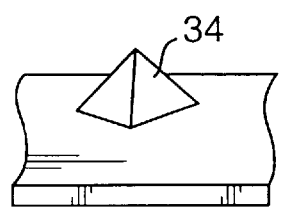
Figure 9:
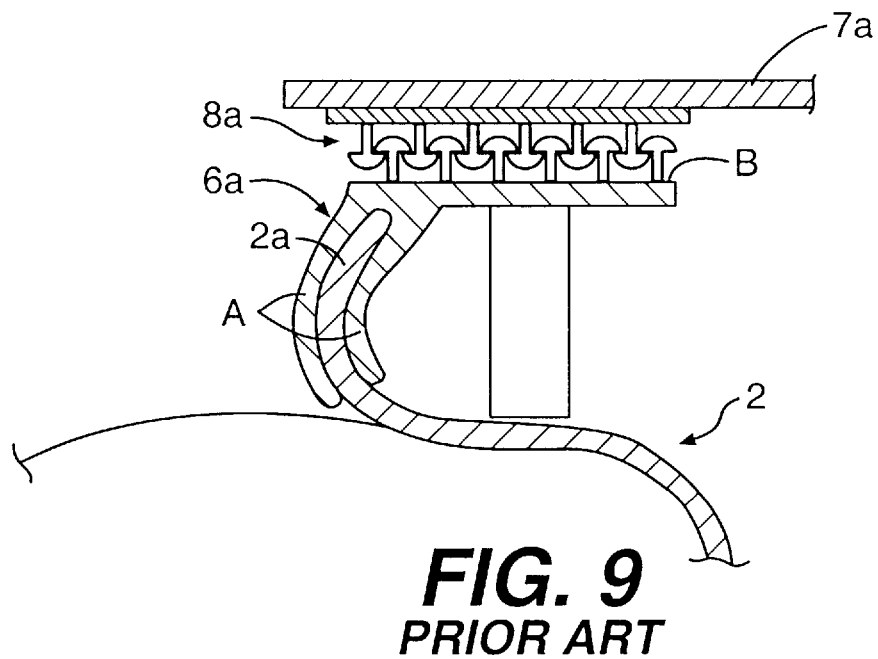
FIG. 9 is a sectional view showing another example of a conventional construction for installing a wheel cover on a disc wheel.

The projection 34 may be spherical, conical, quadrangular-pyramidal or the like as shown in FIGS. 6A and 6B so that the upper end of the projection 34 of the lower sandwiching member 31 contacts (point contact) the lower surface of the supporting portion 22 of the first clip 20 and the lower end of the projection 34 of the upper sandwiching member 31 contacts (point contact) the upper surface of the supporting portion 22. In this case, the supporting portion 22 of the first clip 20 is formed at the center thereof and the inner sandwiching wall 21b is formed at both sides of the supporting portion 22 so that the projection 34 contacts the supporting portion 22 at one point. In this construction, the angle of the second clip 30 can be adjusted in conformity to that of the supporting portion 22 of the first clip 20. That is, the angle of the receiving surface 37 can be adjusted to that of the underside of the wheel cover body 11 even though the first clip 20 and the wheel cover body 11 incline to one side.

In the wheel cover 10 having the above-described construction, the clip 12 can be installed on the disc wheel 1 having the same standardized diameter, by mounting the sandwiching portion 21 of the first clip on the rim flange edge 2a, irrespective of the type thereof, provided that the rim flange edge 2a has a permissible size variation. In addition, the wheel cover 10 can be installed on the disc wheel 1 having no hump formed thereon.

Moreover, in the wheel cover 10 and the clip 12 having the above-described construction, the clip 12 can be installed at any desired positions of the rim flange edge 2a in its circumferential direction. Thus, even though a balance weight is installed on the rim flange edge 2a, the mounting position of the wheel cover 10 is not limited to a particular position. The wheel cover body 11 can be installed on the disc wheel 1 even though both plane fasteners 13 and 35 are dislocated relatively to each other to a small extent, provided that the mushroom-shaped projections 36 of both plane fasteners 13 and 35 engage tightly. If both plane fasteners 13 and 35 are greatly dislocated relatively to each other, the dislocation can be corrected easily by shifting the installing position of the clip 12 in the circumferential direction of the rim flange edge 2a.

Most of the constituent parts of the clip 12 are positioned inwardly in the radial direction of the rim flange edge 2a of the disc wheel 1. That is, only a part of the outer sandwiching wall 21a is positioned outward in the radial direction of the rim flange edge 2a. Thus, there is little possibility that the clip 12 is affected by the deformation of the tire 6 while the car is traveling. Furthermore, because the clip 12 is positioned at the underside of the wheel cover body 11, the clip 12 cannot be seen from the outside, thus not deteriorating the wheel cover body 11 in the viewpoint of ornament.

It has been described that three clips 12 are installed on the rim flange edge 2a in order to reliably install the wheel cover 10 on the disc wheel 1. But it is possible to alter the number of the clips 12 and the position thereof as desired. For example, if the clips 12 cannot be installed on the rim flange edge 2a at equal intervals because the balance weight has been installed thereon, it is preferable to make the intervals between the adjacent clips 12 equal as much as possible.

No claws which engage the hump of the disc wheel 1 are formed on the wheel cover body 11 having the above-described construction, it is possible to manufacture the wheel cover body 11 not by injection molding but by vacuum forming of a plate-shaped plastic material by using a die having a simple shape. Accordingly, the wheel cover body 11 can be manufactured at a low cost.

Figure 10:
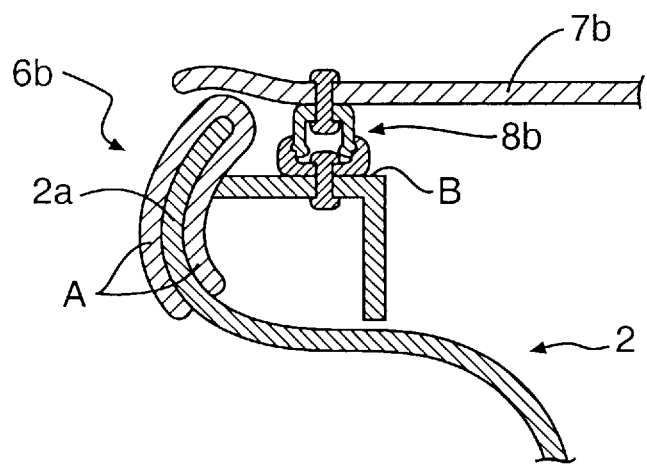
FIG. 10 is a sectional view showing still another example of a conventional construction for installing a wheel cover on a disc wheel.
Figure 11:
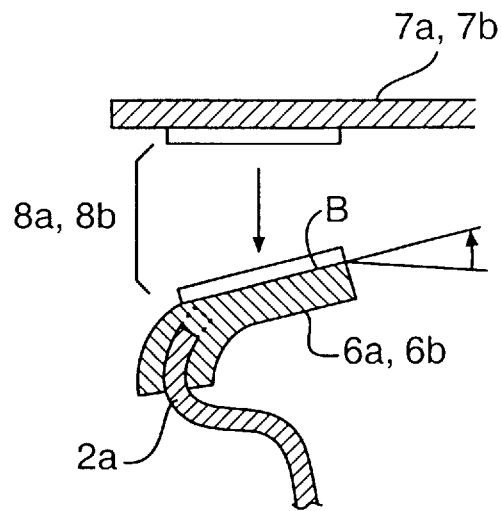
FIG. 11 is a sectional view showing a state in which the wheel cover having the conventional construction cannot be normally installed on a clip.
Figure 12:
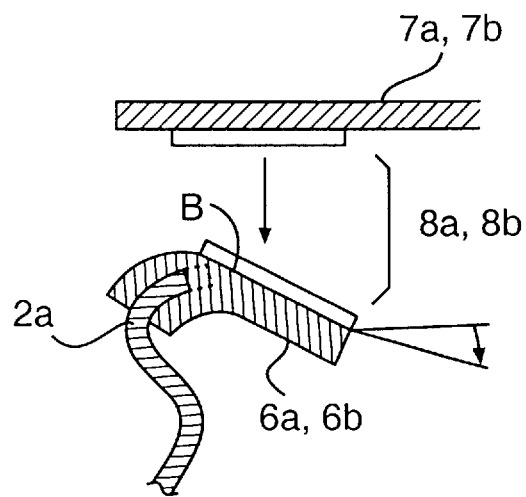
FIG. 12 is a sectional view showing a state in which the wheel cover having the conventional construction cannot be normally installed on the clip.

In the above-described embodiment, in fixing the wheel cover body 11 to the second clip 30, the plane fasteners 35 and 13 comprising the mushroom-shaped projections 36 are used. But the present invention is not limited to the above-described construction, but various modifications can be made. For example, a large number of loops is densely formed on one of the plane fasteners 35 and 13, and a large number of hooks densely formed on the other of the plane fasteners 35 and 13. Further, instead of the plane fastener 35 and 13, an engaging means consisting of a female button and a male button which engages the female button as shown in FIG. 10 or other engaging means may be used.

The invention being thus described, it will be obvious that the same may be varied in many ways. Such variations are not to be regarded as a departure from the spirit and scope of the invention, and all such modifications as would be obvious to one skilled in the art were intended to be included within the scope of the following claims.

What is claimed is:

1. A clip device for connecting a wheel cover to a disc wheel for a car, comprising a first clip member having a sandwiching portion for fixedly sandwiching a rim flange edge of the disc wheel, a second clip member having a connection surface for connecting to a wheel cover body, and connection means for angle-adjustably connecting the first and second clip members to each other, wherein the connection means comprises a supporting portion formed on one of the first and second clip members and a sandwiching member formed on the other of the first and second clip members, the sandwiching member being designed so as to angle-adjustably sandwich the supporting portion.

2. A clip device as claimed in claim 1, wherein the sandwiching member comprises a pair of sandwiching surfaces confronting each other to sandwich the supporting portion, and projections are respectively provided on the sandwiching surfaces so as to contact opposite faces of the supporting portion along a line in a direction substantially perpendicular to a diameter of the wheel cover.

3. A clip device as claimed in claim 1, wherein the sandwiching member comprises a pair of sandwiching surfaces confronting each other to sandwich the supporting portion, and projections are respectively provided on the sandwiching surfaces so as to contact opposite faces of the supporting portion at a point in a direction substantially perpendicular to a diameter of the wheel cover.

4. A wheel cover for use in a car comprising, a disc-like wheel cover body, a plurality of clip devices securable to a disc wheel, and a plurality of fixtures for connecting the wheel cover body to the clip devices, each clip device comprising a first clip member having a sandwiching portion which fixedly sandwiches a rim flange edge of the disc wheel, a second clip member having a connection surface which is connected with each of the fixtures, and connection means for angle-adjustably connecting the first and second clip member to each other, wherein the connection means comprises a supporting portion formed on one of the first and second clip members and a sandwiching member formed on the other of the first and second clip members, the sandwiching member being designed so as to angle-adjustably sandwich the supporting portion.

* * * * *